(12) United States Patent
Lin

(10) Patent No.: US 6,565,301 B1
(45) Date of Patent: May 20, 2003

(54) DEVICE MOUNTED ON CARGO CARRIER FOR HOLDING SECURELY CARGO-LOCATING ROPE

(76) Inventor: Chia-Sheng Lin, P.O. Box 453, Taichung (TW)

( * ) Notice: Subject to any disclaimer, the term of this patent is extended or adjusted under 35 U.S.C. 154(b) by 0 days.

(21) Appl. No.: 10/098,424

(22) Filed: Mar. 18, 2002

(51) Int. Cl.$^7$ .............................................. B61D 45/00
(52) U.S. Cl. ..................................................... 410/107
(58) Field of Search .................................. 410/106, 107, 410/108, 109, 110, 111, 113, 116; 248/499; 24/265 CD, 115 K

(56) References Cited

U.S. PATENT DOCUMENTS

| | | | | |
|---|---|---|---|---|
| 3,102,708 A | * | 9/1963 | Crain ........................... | 410/107 |
| 4,191,108 A | * | 3/1980 | Jones ........................... | 410/110 |
| 4,820,093 A | * | 4/1989 | Hirakui et al. ............... | 410/107 |
| 4,820,094 A | * | 4/1989 | Hirakui et al. ............... | 410/107 |
| 5,004,388 A | * | 4/1991 | Harris ........................... | 410/107 |
| 5,106,248 A | * | 4/1992 | Harris ........................... | 410/107 |
| 5,676,508 A | * | 10/1997 | Weicht ......................... | 410/101 |
| 5,915,900 A | * | 6/1999 | Boltz ............................ | 410/110 |
| 5,971,684 A | * | 10/1999 | Wang ........................... | 410/107 |
| 6,464,437 B1 | * | 10/2002 | Elwell .......................... | 410/107 |
| 6,468,009 B2 | * | 10/2002 | Elwell et al. ................. | 410/107 |

* cited by examiner

Primary Examiner—Stephen T. Gordon

(57) ABSTRACT

A device is mounted on a cargo carrier to catch a cargo-locating rope and is formed of a housing in which a hooked body is disposed extractably and retractably in conjunction with two springs and a guide rod. The hooked body is urged by the springs. The guide rod is pivoted at one end with the hooked body such that other end of the guide rod is slidably received in a track of the housing. As the hooked body is extracted from the housing, the other end of the guide rod is retained at a first locating portion of the track. The other end of the guide rod runs in the track to locate at a second locating portion of the track when the hooked body is retracted into the housing.

3 Claims, 7 Drawing Sheets

DEVICE MOUNTED ON CARGO CARRIER FOR HOLDING SECURELY CARGO-LOCATING ROPE

BACKGROUND OF THE INVENTION

1. Field of the Invention

The present invention relates generally to a cargo-locating structure, and more particularly to a device which is mounted on a cargo carrier to hold securely a cargo-locating rope.

2. Description of Related Art

As shown in FIGS. 1–3, a cargo is located on a cargo carrier 06 by a plurality of devices 05 and ropes 07 which are held securely by the devices 05. These prior art devices 05 are formed of a hooked body 11, a push knob 12, and a retaining body 13.

Such a prior art device as described above is defective in design in that it can not be used with ease and speed, and that it is not provided with a protective means to prevent the damage of the device by impact.

BRIEF SUMMARY OF THE INVENTION

The primary objective of the present invention is to provide a cargo-locating device which is free of the drawbacks of the prior art device described above.

The device of the present invention comprises a housing in which a hooked body is disposed in conjunction with a guide rod and two springs. The hooked body is pivotally fastened with top end of the guide rod. The housing is provided with a first locating portion and a second locating portion. The bottom end of the guide rod can be located in the first locating portion or the second locating portion. When the hooked body is extracted from the housing, the guide rod is located by the first locating portion. As the hooked body is retracted into the housing, the guide rod is located by the second locating portion.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
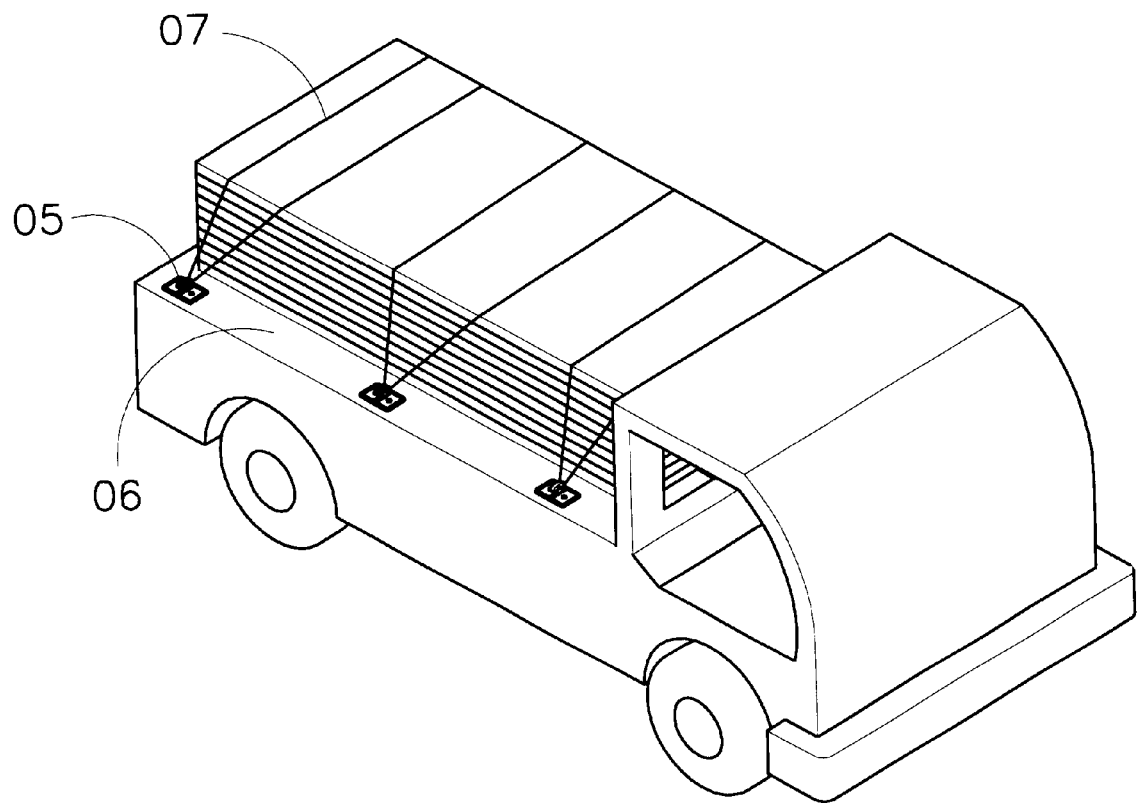
FIG. 1 shows a schematic view of a prior art device at work.
Figure 2:
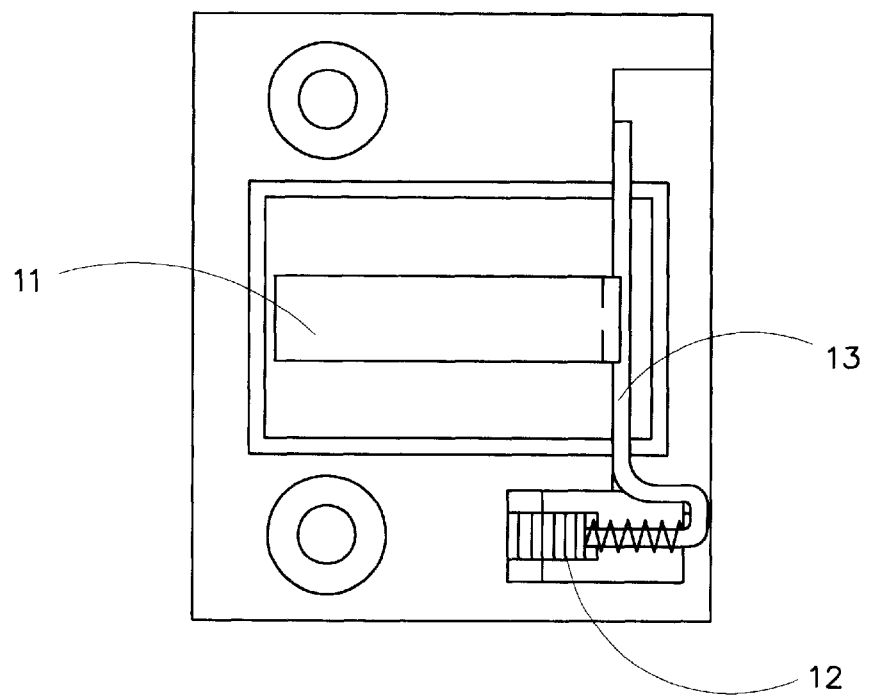
FIG. 2 shows two top plan views of the prior art device as shown in FIG.1.
Figure 2:
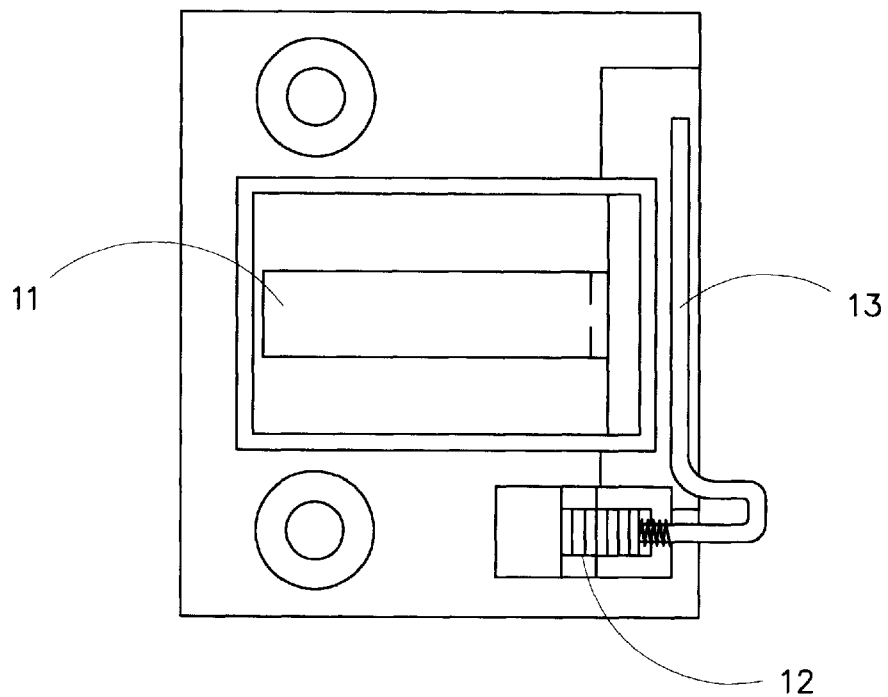
Figure 3:
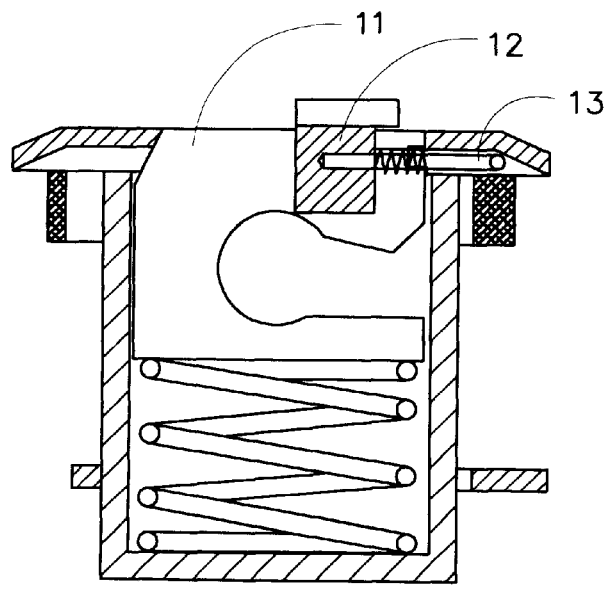
FIG. 3 shows two sectional views of the prior art device as shown in FIG. 1.
Figure 3:
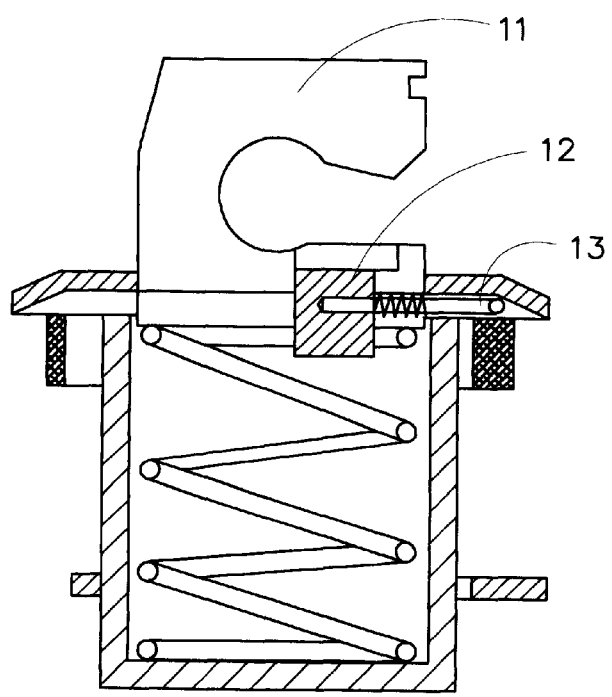
Figure 4:
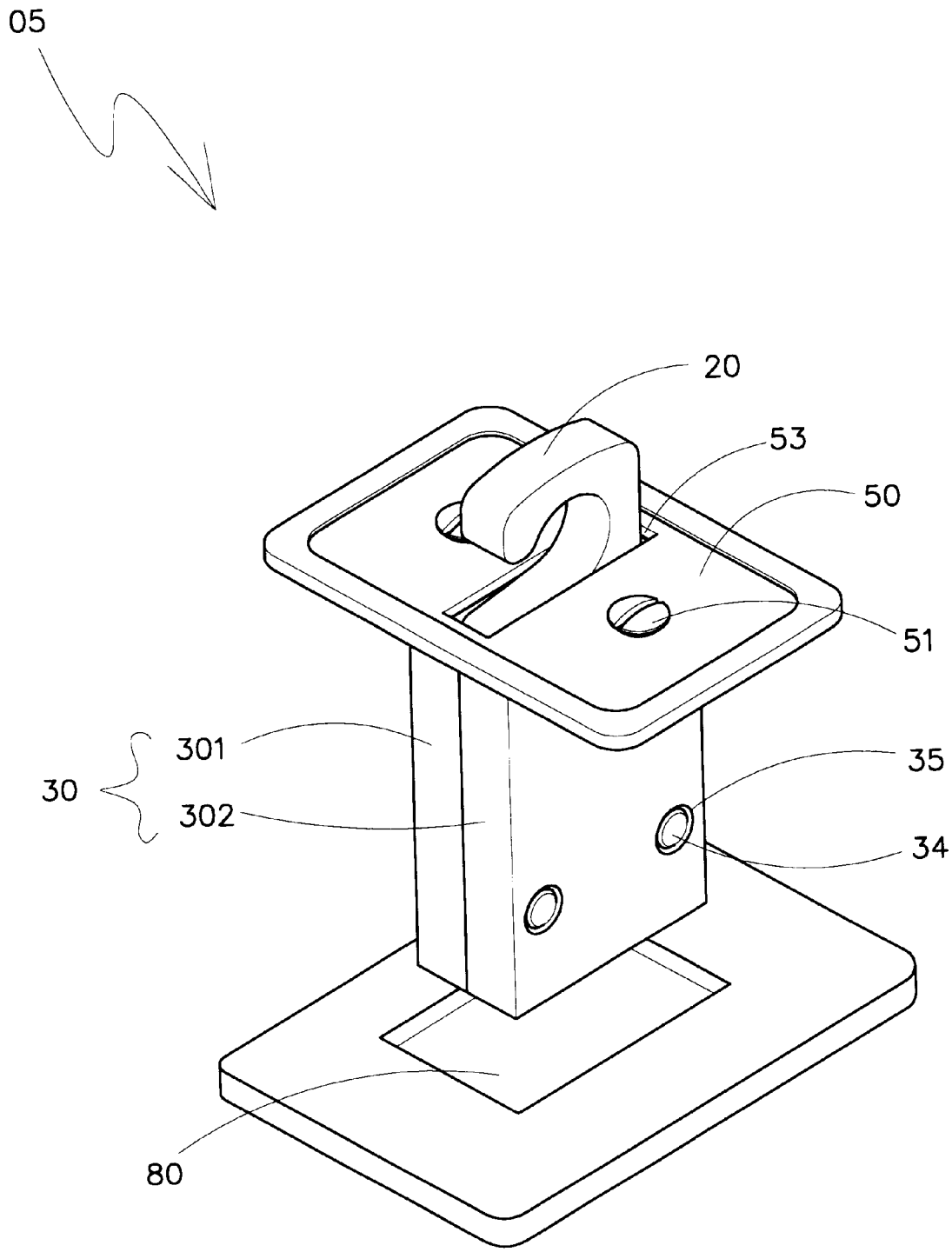
FIG. 4 shows a perspective view of the preferred embodiment of the present invention.
Figure 5:
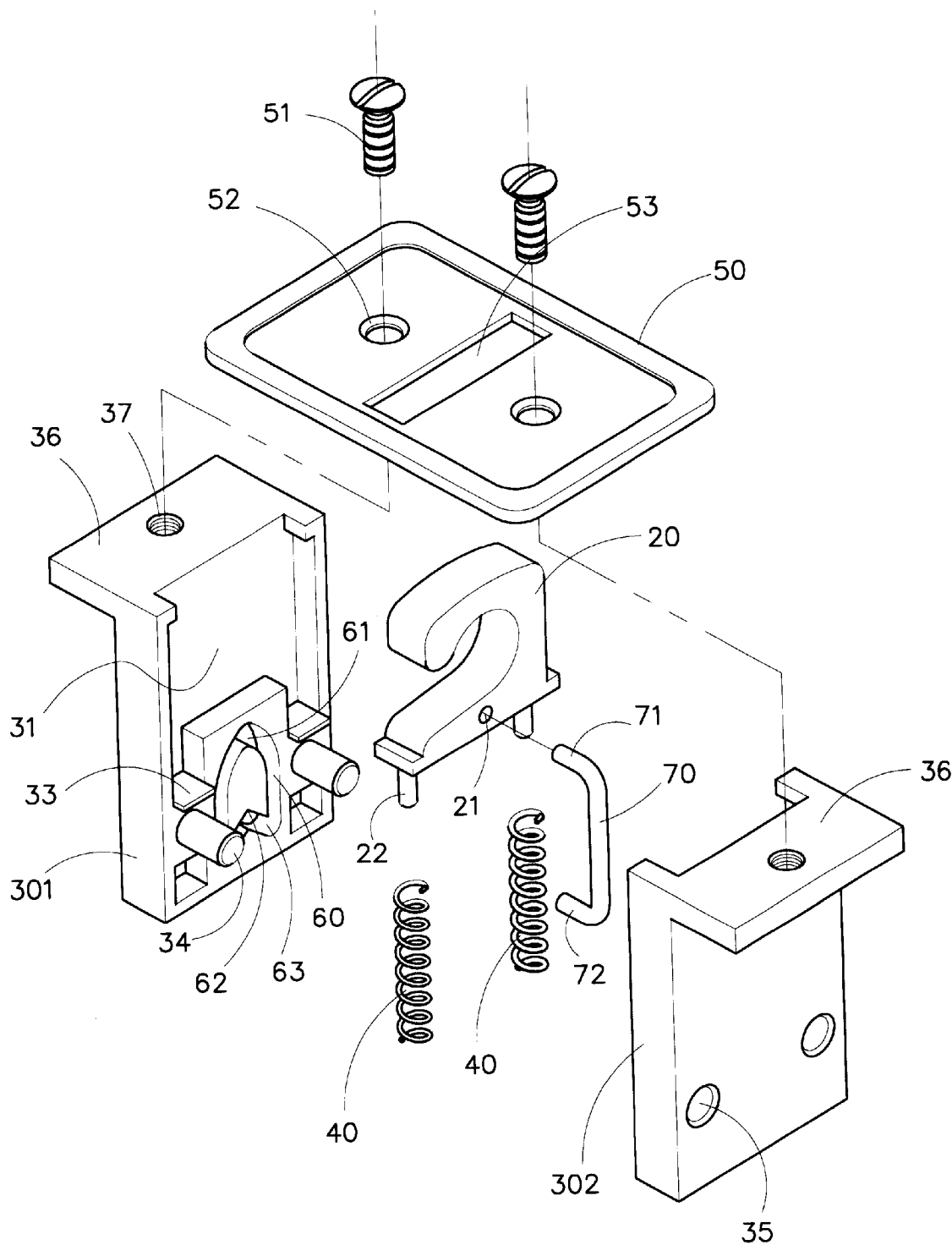
FIG. 5 shows an exploded view of the preferred embodiment of the present invention.
Figure 6:
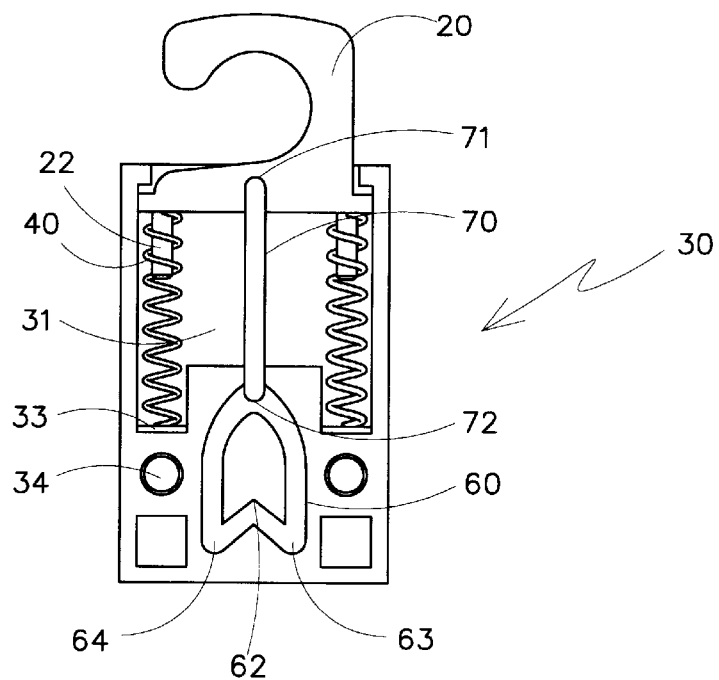
FIG. 6 shows a sectional view of the preferred embodiment of the present invention with the hooked body being extracted.

As shown in FIGS. 4–9, a device 05 embodied in the present invention is mounted on a cargo carrier to catch a cargo-locating rope and is formed of a hooked body 20, a housing 30, two springs 40, a cover 50, and a guide rod 70.

The housing 30 is formed of two housing members 36, which are provided in the top with a threaded hole 37. One of the housing members 36 is provided with a receiving piece 301 which is in turn provided in the inner side wall with a receiving slot 31. The receiving slot 31 is provided with two spring stands 33, two projections 34, and an endless track 60. The track 60 has a first locating portion 61, a second locating portion 62, a first curved portion 63, and a second curved portion 64. The other one of the two housing members 36 is provided with a receiving piece 302 which is in turn provided with two receiving through holes 35 corresponding in location to the projections 34 of the receiving piece 301. The two housing members 36 are joined together such that the two projections 34 are received in the two receiving holes 35.

The hooked body 20 is provided at the bottom end with a pivoting hole 21 and two pillars 22. The hooked body 20 is movably received in the interior of the housing 30 in conjunction with two springs 40, each having one end that is fitted over the pillar 22 of the hooked body 20, and another end that is rested on the spring stand 33.

The guide rod 70 has a top end 71 which is pivoted in the pivoting hole 21 of the hooked body 20, and a bottom end 72 that is slidably received in the track 60.

The cover 50 is provided with two through holes 52 corresponding in location to the two threaded holes 37 of the housing 30. The cover 50 is further provided with a through slot 53. The cover 50 is fastened with the housing 30 by two fastening bolts 51, which are engaged with the two threaded holes 37 of the housing 30 via the through holes 52 of the cover 50.

Figure 7:
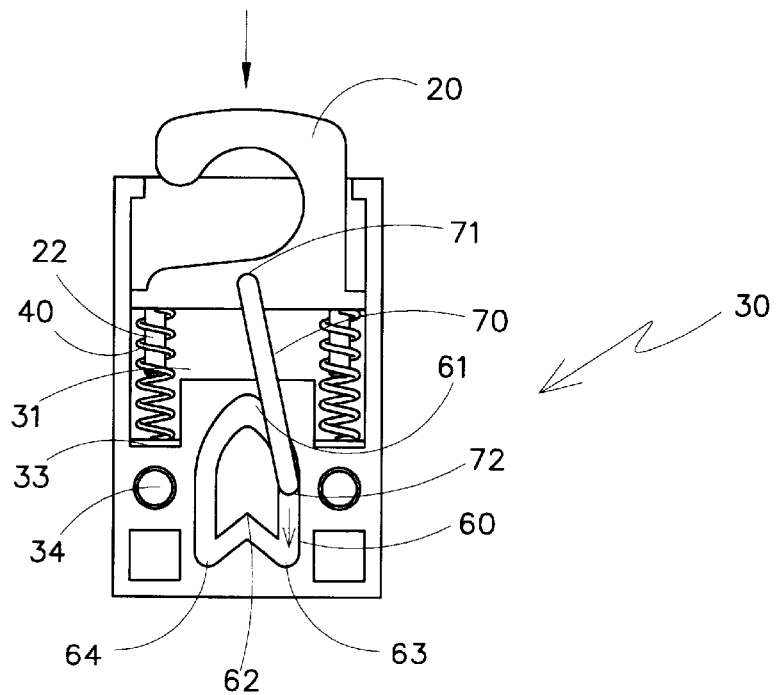
FIG. 7 shows a sectional view of the preferred embodiment of the present invention with the hooked body being exerted on by an external force by which the hooked body is retracted into the housing.
Figure 8:
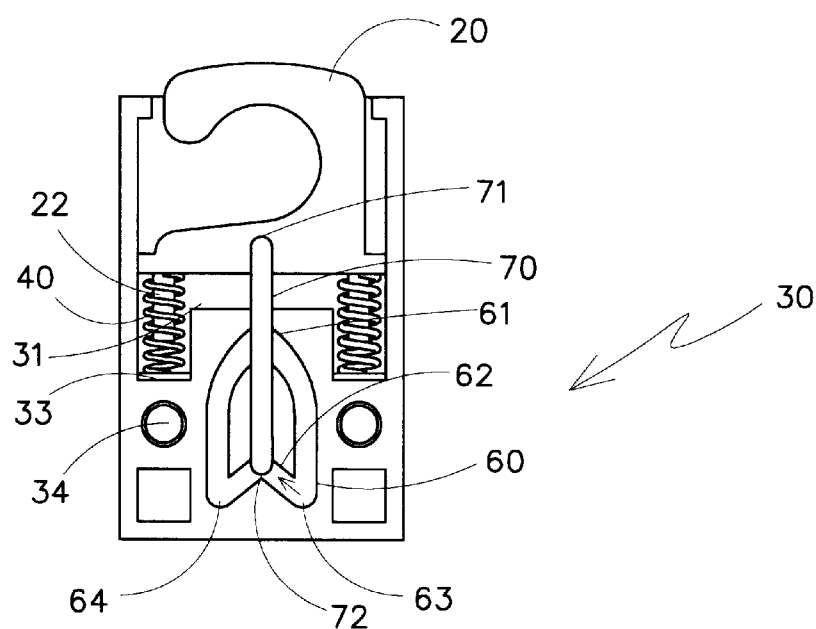
FIG. 8 shows a sectional schematic view of the preferred embodiment of the present invention with the hooked body being retracted into the housing.
Figure 9:
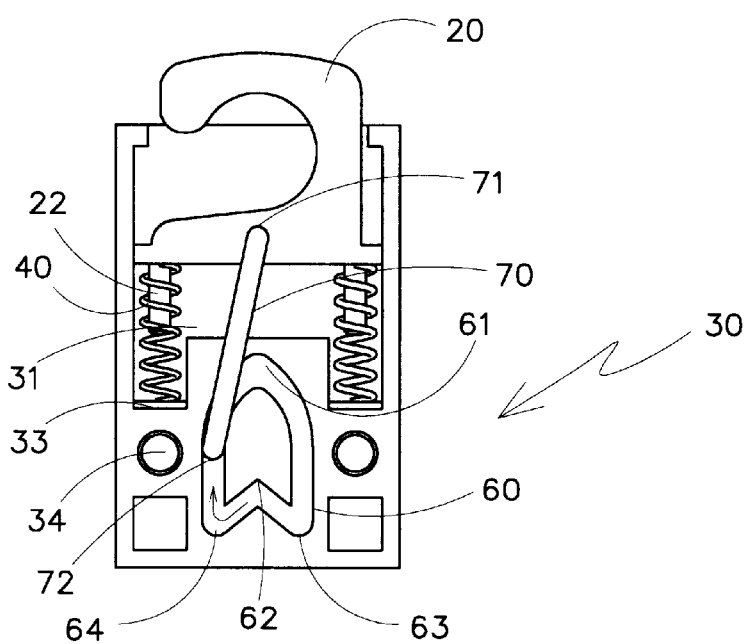
FIG. 9 shows a sectional schematic view of the preferred embodiment of the present invention with the bottom end of the guide rod moving away from the second locating portion to the first locating portion.

In operation, the hooked body 20 is extracted from the interior of the housing 30 via the through slot 53 of the cover 50 such that the bottom end 72 of the guide rod 70 is retained in the first locating portion 61 of the track 60. The hooked body 20 can be then retracted into the interior of the housing 30 by an external force exerting on the hooked body 20, as illustrated in FIG. 7. In the meantime, the bottom end 72 of the guide rod 70 runs from the first locating portion 61 of the track 60 to the second locating portion 62 of the track 60. When the hooked body 20 is completely retracted into the interior of the housing 30, the bottom end 72 of the guide rod 70 is retained in the second locating portion 62 of the track 60, as illustrated in FIG. 8.

The device of the present invention further comprises a base 80 by which the device of the present invention is mounted on a cargo carrier. The housing 30 is mounted on the base 80.

The embodiment of the present invention described above is to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. A device mounted on a cargo carrier to catch a rope which is used to locate cargo on the cargo carrier, said device comprising:

a housing which is provided in a hollow interior with two stands and a track whereby said track is provided with a first locating portion and a second locating portion;

a hooked body provided at a bottom with a pivoting hole and two pillars and disposed movably in the interior of said housing in conjunction with two springs each having one end that is fitted over one of said two pillars of said hooked body such that an other end of said each spring is mounted on one of said two stands of said housing whereby said hooked body is further provided with a guide rod which is pivoted at one end thereof in said pivoting hole of said hooked body such that an other end of said guide rod is slidably received in said track of said housing; and a cover fastened with a top end of said housing and provided with a through slot;

said hooked body capable of being extracted from the interior of said housing via said through slot of said cover such that the other end of said guide rod is retained in said first location portion of said track of said housing whereby said hooked body can be retracted into the interior of said housing such that the other end of said guide rod runs in said track to be retained in said second locating portion of said track.

2. The device as defined in claim 1, wherein said guide rod is of a U-shaped construction and has two arms parallel to each other, one of said two arms having said first rod end which defines a first free end which is pivoted in said pivoting hole of said hooked body, other one of said two arms having said second rod end which defines a second free end which is slidably received in said track such that said second free end is retained in said first locating portion of said track at the time when said hooked body is extracted from the interior of said housing, and that said second free end runs in said track to locate at said second locating portion of said track at the time when said hooked body is retracted into the interior of said housing.

3. The device as defined in claim 1 further comprising a base on which said housing is mounted whereby said base is mounted on the cargo carrier to enable said hooked body to catch the cargo-locating rope.

\* \* \* \* \*